US010090937B2

United States Patent
Jeng et al.

(10) Patent No.: US 10,090,937 B2
(45) Date of Patent: Oct. 2, 2018

(54) APPARATUS AND METHOD FOR ELIMINATING IMPULSE INTERFERENCE

(71) Applicant: MStar Semiconductor, Inc., Hsinchu Hsien (TW)

(72) Inventors: You-Tsai Jeng, Zhubei (TW); Fang-Ming Yang, Zhubei (TW); Kuo-Yu Lee, Zhubei (TW); Keng-Lon Lei, Zhubei (TW); Tai-Lai Tung, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 177 days.

(21) Appl. No.: 14/941,795

(22) Filed: Nov. 16, 2015

(65) Prior Publication Data
US 2017/0063473 A1    Mar. 2, 2017

(30) Foreign Application Priority Data

Aug. 31, 2015    (TW) .............................. 104128626 A

(51) Int. Cl.
*H04B 15/00*    (2006.01)
*H04L 1/00*    (2006.01)
*H04L 1/20*    (2006.01)

(52) U.S. Cl.
CPC .......... *H04B 15/00* (2013.01); *H04L 1/0047* (2013.01); *H04L 1/0057* (2013.01); *H04L 1/20* (2013.01)

(58) Field of Classification Search
CPC ......... H04B 15/00; H04L 1/0047; H04L 1/20; H04L 1/0057
USPC .......................................... 714/776; 375/346
See application file for complete search history.

(56) References Cited

U.S. PATENT DOCUMENTS

| | | | | |
|---|---|---|---|---|
| 4,712,235 A * | 12/1987 | Jones, Jr. | ............... | H04B 3/234 379/406.04 |
| 5,226,057 A * | 7/1993 | Boren | ................ | H03H 21/0021 375/350 |
| 6,385,261 B1 * | 5/2002 | Tsuji | ........................ | H04B 1/10 375/254 |
| 6,701,129 B1 * | 3/2004 | Hashem | ................ | H04L 1/0025 370/468 |
| 7,016,739 B2 * | 3/2006 | Bange | .................. | H04B 1/1036 607/60 |

(Continued)

OTHER PUBLICATIONS

TIPO Office Action, dated Jul. 11, 2016, 5 pages.

*Primary Examiner* — John J Tabone, Jr.
(74) *Attorney, Agent, or Firm* — Edell, Shapiro & Finnan, LLC

(57) ABSTRACT

An apparatus for eliminating impulse interference includes an impulse interference detecting unit, an impulse interference eliminating unit and a control unit. The impulse interference detecting unit detects whether impulse interference exists in an input signal according to a predetermined condition, and generates an impulse interference eliminating request when having detected that the input signal satisfies the predetermined condition. In response to the impulse interference eliminating request, the impulse interference eliminating unit performs an impulse interference eliminating process on the input signal to generate an output signal. According to an output signal quality index associated with the output signal, the control unit selectively adjusts the predetermined condition used for detecting whether the impulse interference exists.

8 Claims, 4 Drawing Sheets

(56) References Cited

U.S. PATENT DOCUMENTS

| | | | |
|---|---|---|---|
| 7,139,338 B2 * | 11/2006 | Wilson | H04L 25/0216 375/343 |
| 7,428,669 B2 * | 9/2008 | Cioffi | H04B 3/32 714/704 |
| 7,499,497 B2 * | 3/2009 | Huang | H04L 25/022 375/260 |
| 7,558,337 B2 * | 7/2009 | Ma | H04L 25/0228 375/316 |
| 7,573,966 B2 * | 8/2009 | Kim | H04L 25/03076 375/348 |
| 7,630,448 B2 * | 12/2009 | Zhidkov | H04L 27/2647 375/260 |
| 7,676,046 B1 * | 3/2010 | Nelson | H04B 1/1027 375/227 |
| 7,894,536 B2 * | 2/2011 | Risbo | H03M 3/388 341/120 |
| 8,014,478 B2 * | 9/2011 | Liu | H03G 3/345 375/346 |
| 8,509,365 B2 * | 8/2013 | Hu | H03H 21/0021 375/346 |
| 9,646,621 B2 * | 5/2017 | Sehlstedt | G10L 19/012 |
| 2003/0099287 A1 * | 5/2003 | Arambepola | H03G 3/345 375/227 |
| 2003/0139165 A1 | 7/2003 | Smith et al. | |
| 2004/0208138 A1 * | 10/2004 | Hayashi | H04L 1/0047 370/286 |
| 2005/0162566 A1 * | 7/2005 | Chuang | H04N 7/012 348/714 |
| 2005/0215210 A1 * | 9/2005 | Walker | H04W 52/029 455/130 |
| 2006/0195756 A1 | 8/2006 | Yoshii | |
| 2006/0232709 A1 * | 10/2006 | Renner | H04N 5/21 348/607 |
| 2006/0256764 A1 * | 11/2006 | Yang | H04M 9/08 370/342 |
| 2009/0168929 A1 * | 7/2009 | Liu | H03G 3/345 375/346 |
| 2009/0201172 A1 * | 8/2009 | Edell | A61B 5/0002 340/870.3 |
| 2009/0323903 A1 * | 12/2009 | Cioffi | H04B 1/1027 379/32.01 |
| 2010/0054150 A1 * | 3/2010 | Oksman | H04L 1/0071 370/252 |
| 2010/0081387 A1 * | 4/2010 | Shi | H04B 17/318 455/62 |
| 2011/0069798 A1 * | 3/2011 | Lo | H04B 1/10 375/350 |
| 2011/0135048 A1 * | 6/2011 | Mo | H04L 27/2657 375/359 |
| 2011/0206208 A1 * | 8/2011 | Augustyn | H04B 15/00 381/1 |
| 2011/0270792 A1 * | 11/2011 | Browne | G06K 9/6277 706/48 |
| 2012/0114061 A1 * | 5/2012 | Kang | H04L 25/4904 375/285 |
| 2012/0257698 A1 * | 10/2012 | Zhang | H03M 1/1265 375/355 |
| 2015/0081929 A1 * | 3/2015 | Wang | G06F 13/10 710/8 |
| 2015/0365971 A1 * | 12/2015 | Chen | H04W 74/0816 370/252 |
| 2016/0267908 A1 * | 9/2016 | Borjeson | G10L 15/22 |
| 2016/0359608 A1 * | 12/2016 | Noh | H04L 5/1461 |

\* cited by examiner

APPARATUS AND METHOD FOR ELIMINATING IMPULSE INTERFERENCE

This application claims the benefit of Taiwan application Serial No. 104128626, filed Aug. 31, 2015, the subject matter of which is incorporated herein by reference.

BACKGROUND OF THE INVENTION

Field of the Invention

The invention relates to technologies for eliminating impulse interference.

Description of the Related Art

With the progress in communication technologies, the development of digital television broadcasting has also gradually matured. In addition to base stations and artificial satellites, digital television signals may also be transmitted through cable wires. The Digital Video Broadcasting-Cable (DVB-C) is one current common standard. For a DVB-C system, external interference frequently occurring in the signal transmission process includes impulse interference, adjacent channel interface and co-channel interference. In order to correct retrieve an input signal, a DVB-C receiver end needs to eliminate the effect that the above types of interference has on signal contents.

FIG. 1 shows a typical impulse interference eliminating apparatus. As shown in FIG. 1, an impulse interference eliminating apparatus 100 includes an impulse interference detecting circuit 12 and an impulse interference eliminating circuit 14. The impulse interference detecting circuit 12 detects whether impulse interference exists in an input signal Sin, and generates an impulse interference eliminating request Re only when having detected that impulse interference exists in the input signal Sin. According to whether the impulse interference eliminating request Re is received, the impulse interference eliminating circuit 14 determines whether to perform an impulse interference eliminating process on the input signal Sin to generate an output signal Sout. More specifically, only when the impulse interference eliminating circuit 14 receives the impulse interference eliminating request Re, the impulse interference eliminating circuit 14 performs an impulse interference eliminating process on the input signal Sin. Thus, the output signal Sout of the impulse interference eliminating circuit 14 is different from the input signal Sin. On the other hand, when the impulse interference eliminating circuit 14 does not receive the impulse interference eliminating request Re, the impulse interference eliminating circuit 14 does not perform the impulse interference eliminating process on the input signal Sin. Thus, the output signal Sout of the impulse interference eliminating circuit 14 is identical to the input signal Sin.

However, apart from impulse interference, adjacent channel interference and co-channel interference may simultaneously occur in the input signal Sin. An input signal mixed with multiple types of interference may cause misjudgment of the impulse interference detecting circuit 12. That is, the impulse interference detecting circuit 12 may regard non-impulse interference as impulse interference, such that the impulse interference eliminating circuit 14 may be mislead to erroneously perform an impulse interference eliminating process on the input signal Sin.

Erroneously triggering the impulse interference eliminating circuit 14 may cause undesirable effects on other performances on a system corresponding to the impulse interference eliminating apparatus 100. For example, the impulse interference detecting circuit 12 and the impulse interference eliminating circuit 14 may be disposed at a signal receiver end, and the impulse interference eliminating circuit 14 may be a Reed-Solomon decoder. The input signal Sin of the signal receiver end may include multiple packets. Each of the packets includes multiple symbols, which may include one or multiple erroneous symbols with known positions and/or one or multiple erroneous symbols with unknown positions. The impulse interference detecting circuit 12 notifies the Reed-Solomon decoder of the position of impulse interference in the input signal Sin detected, and the symbol occurring at that position is regarded as an erroneous symbol with a known position. The Reed-Solomon decoder then accordingly corrects the erroneous symbol with the known position and other erroneous symbols with unknown positions to decode the packet. However, the Reed-Solomon has a limited error correction capability. More specifically, as the number of erroneous symbols with known positions gets larger, the number of erroneous symbols with unknown positions the Reed-Solomon decoder can correct gets smaller. If the number of erroneous symbols with unknown positions exceeds the number of symbols the Reed-Solomon decoder can correct, the packet may not be successfully decoded and become an erroneous packet. It is known that, if the impulse interference detecting circuit 12 misjudges non-impulse interference as impulse interference, and the non-impulse interference does not in fact cause an error in the symbol at the position of the interference, the misjudged non-impulse interference may consume the error correction capability the Reed-Solomon decoder could have used for correcting erroneous symbols with unknown positions, hence resulting in an increased packet error rate in the output signal.

SUMMARY OF THE INVENTION

To solve the foregoing issue, the present invention is directed to an apparatus and method for eliminating impulse interference. By adaptively adjusting a predetermined condition an impulse interference detecting circuit adopts, the apparatus and method of the present invention are capable of effectively reducing the probability of erroneously triggering an impulse interference eliminating circuit by adjacent channel interference or co-channel interference. It should be noted that, the concept of the present invention is applicable to DVB-C receiving systems as well as other signal receiving systems with a need for eliminating impulse interference.

An apparatus for eliminating impulse interference is provided according to an embodiment of the present invention. The apparatus includes an impulse interference detecting unit, an impulse interference eliminating unit and a control unit. The impulse interference detecting unit detects whether impulse interference exists in an input signal according to a predetermined condition, and generates an impulse interference eliminating request when having detected that the input signal satisfies the predetermined condition. In response to the impulse interference eliminating request, the impulse interference eliminating unit performs an impulse interference eliminating process on the input signal to generate an output signal. According to an output signal quality index associated with the output signal, the control unit selectively adjusts the predetermined condition used for detecting whether impulse interference exists.

A method for eliminating impulse interference is provided according to another embodiment of the present invention. It is detected whether impulse interference exists in an input signal according to a predetermined condition. When it is detected that the input signal satisfies the predetermined condition, an impulse interference eliminating request is generated. In response to the impulse interference eliminating request, an impulse interference eliminating process is performed on the input signal to generate an output signal. According to an output signal quality index associated with the output signal, the predetermined condition is selectively adjusted.

The above and other aspects of the invention will become better understood with regard to the following detailed description of the preferred but non-limiting embodiments. The following description is made with reference to the accompanying drawings.

Figure 1:
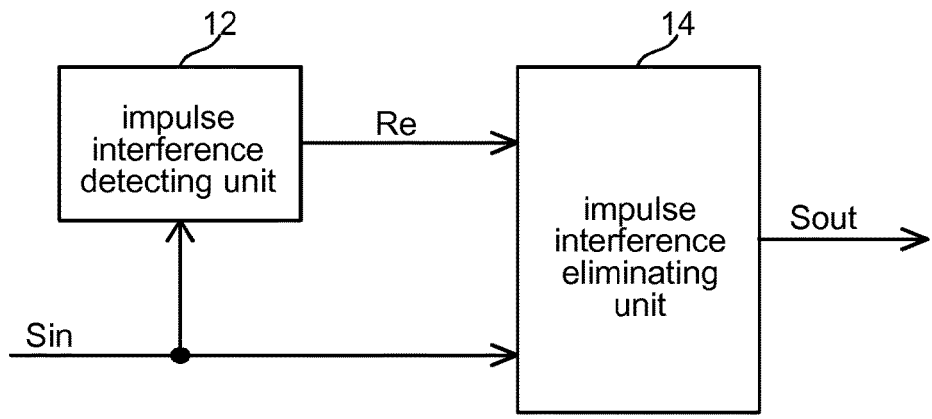
FIG. 1 is a schematic diagram of a typical impulse interference eliminating apparatus.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2:
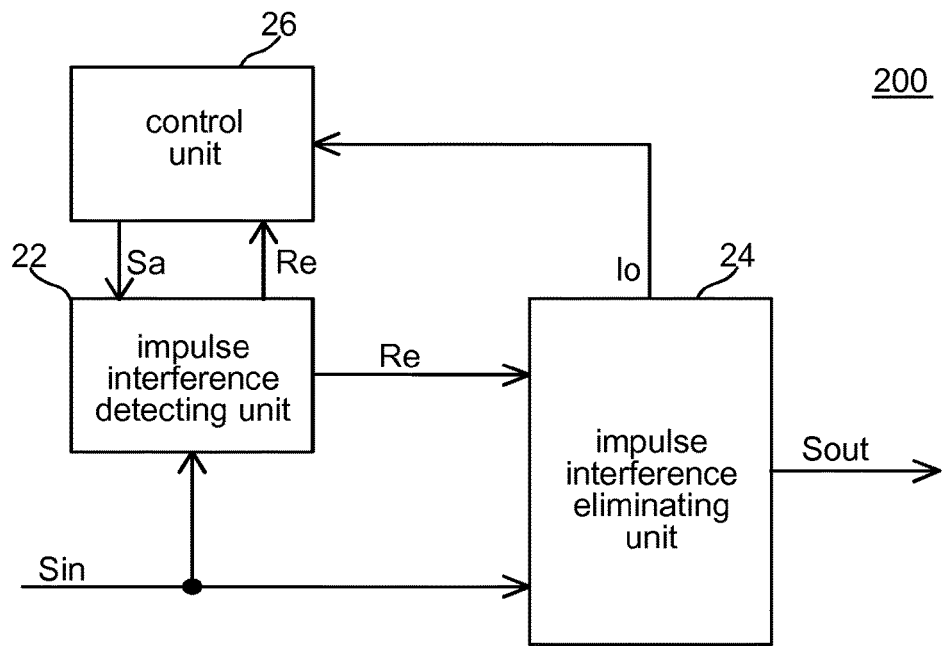
FIG. 2 is a schematic diagram of an impulse interference eliminating apparatus according to an embodiment of the present invention.

FIG. 2 shows a schematic diagram of an impulse interference eliminating apparatus 200 according to an embodiment of the present invention. The an impulse interference eliminating apparatus 200 includes an impulse interference detecting unit 22, an impulse interference eliminating unit 24 and a control unit 26.

Figure 3:
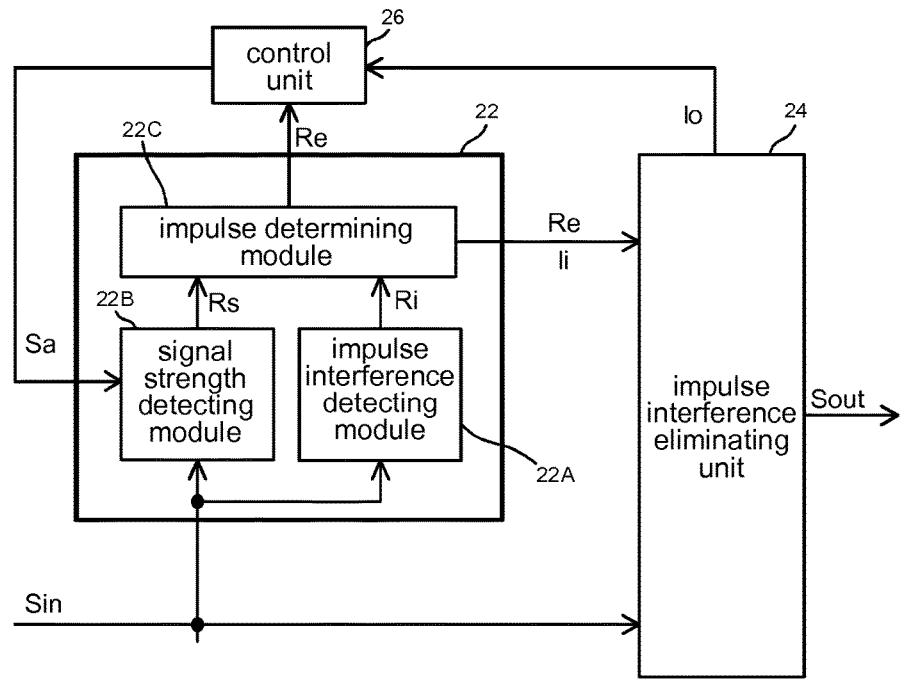
FIG. 3 is a detailed schematic diagram of an impulse interference detecting unit according to an embodiment of the present invention.

In one embodiment, the impulse interference eliminating apparatus 200 may be disposed in a signal receiver end. The impulse interference detecting unit 22 detects whether impulse interference exists in an input signal Sin the signal receiver end receives according to a predetermined condition, and generates an impulse interference eliminating request Re when having detected that the input signal Sin satisfies the predetermined condition. In one embodiment, the predetermined condition includes whether an impulse characteristic appears in a waveform of the input signal Sin and whether signal strength of the input signal Sin is higher than a strength threshold. For example, FIG. 3 shows a detailed schematic diagram of the impulse interference detecting unit 22 according to an embodiment. The impulse interference detecting unit 22 includes a impulse detecting module 22A, a signal strength detecting module 22B and an impulse determining module 22C. An input signal Sin is provided to the impulse detecting module 22A and the signal strength detecting module 22B. The impulse detecting module 22A generates an impulse detection result Ri according to the input signal Sin, which indicates whether an impulse characteristic (e.g., whether an abnormal voltage pulse that drastically fluctuate exists within a short period of time) appears in the waveform of the input signal Sin. According to the input signal Sin, the signal strength detecting module 22B generates a signal strength detection result Rs, which indicates whether the signal strength of the input signal Sin is higher than a strength threshold. The impulse determining module 22C determines whether impulse interference exists in the input signal Sin according to the impulse detection result Ri and the signal strength detection result Rs. When the impulse determining module 22C determines that an impulse characteristic appears in the waveform of the input signal Sin according to the impulse detection result Ri and the signal strength detection result Rs, and the signal strength at the time substantially the same as the time of the impulse characteristic is higher than the strength threshold, the impulse determining module 22C further determines that the input signal Sin satisfies the predetermined condition to generate an impulse interference eliminating request Re. It should be noted that, details of the determination for whether the impulse characteristic appears in the waveform of the input signal Sin of the impulse detecting module 22A and the strength threshold of the signal strength detecting module 22B may be determined according to simulation results or practical experiences.

In response to the impulse interference eliminating request Re, the impulse interference eliminating unit 24 performs an impulse interference eliminating process on the input signal Sin to generate an output signal Sout. For example, the impulse interference eliminating unit 24 may be a Reed-Solomon decoder, and the impulse interference eliminating process may be a Reed-Solomon error correction process. More specifically, the Reed-Solomon decoder may obtain impulse position information Ii from the impulse determining module 22C. The impulse position information Ii indicates symbols corresponding to the waveform with the impulse characteristic and having signal strength higher than the strength threshold in the input signal Sin. The impulse interference eliminating unit 24 regards these symbols as erroneous symbols with known positions according to the impulse position information Ii, and accordingly performs a Reed-Solomon error correction process on the input signal Sin to generate the output signal Sout. In other words, after receiving the impulse interference eliminating request Re, the impulse interference eliminating unit 24 outputs the output signal Sout that is the input signal Si having been processed by the Reed-Solomon error correction process.

Figure 4:
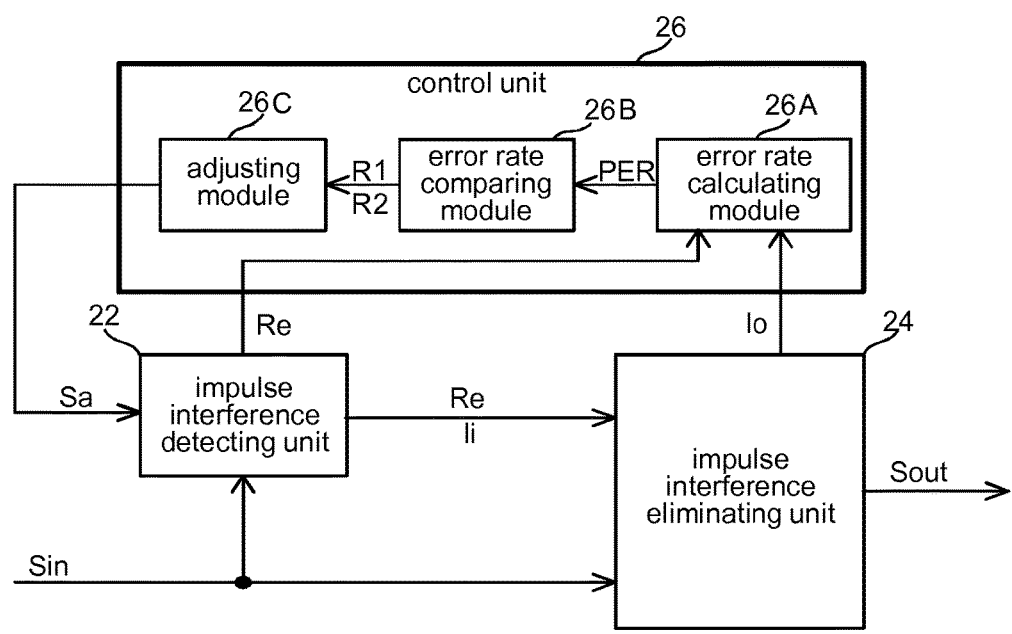
FIG. 4 is a detailed schematic diagram of a control unit according to an embodiment of the present invention.

The impulse interference detecting unit 22 may also send the impulse interference eliminating request Re to the control unit 26. In response to the impulse interference eliminating request Re, the control unit 26 generates an output signal quality index according to output signal information Io the impulse interference eliminating unit 24 provides, and selectively generates an adjusting signal Sa according to the output signal quality index to adjust the predetermined condition the impulse interference detecting unit 22 uses for detecting whether impulse interference exists. In practice, the control unit 26 may start to generate the output signal quality index after receiving the impulse interference eliminating request Re from the impulse interference detecting unit 22. In one embodiment, the output signal quality index may be a packet error rate. FIG. 4 shows a detailed schematic diagram of the control unit 26 according to an embodiment. The control unit 26 includes an error rate calculating module 26A, an error rate comparing module 26B and an adjusting module 26C. For example, the impulse interference eliminating unit 24 is a Reed-Solomon decoder that provides output signal information Io to the error rate calculating module 26A. The output signal information Io indicates whether each of the packets in the output signal Sout can be correctly decoded. After receiving the impulse interference eliminating request Re, the error rate calculating module 26A starts to calculate a packet error rate PER of the output signal Sout according to the output signal information Io. The packet error rate PER of the output signal Sout serves as the output signal quality index. For example, out of 768 packets of the output signal Sout, the packet error rate PER indicates the number of packets that cannot be decoded after undergoing the Reed-Solomon error correction process. Details of the Reed-Solomon error correction process and means for generating the packet error rate are known to one person skilled in the art, and shall be omitted herein. According to the packet error rate PER and a first error rate threshold, the error rate comparing module 26B generates a first packet error comparison result R1, which indicates whether the packet error rate PER is higher than the first packet error rate threshold. The adjusting module 26C generates an adjusting signal Sa according the first error rate comparison result R1 to the impulse interference detecting unit 22 to adjust the predetermined condition that the impulse interference detecting unit 22 uses for detecting whether impulse interference exists.

For example, a high packet error rate PER may represent that the predetermined condition the impulse interference detecting unit 22 currently uses for detecting whether impulse interference exists is too low, in a way that the impulse interference detecting unit 22 is too easily erroneously triggered. As a result, the number of erroneous symbols with unknown positions that can be corrected by the impulse interference eliminating unit 24 is decreased, and the number of erroneous packets that cannot be completely decoded is increased. Thus, if the adjusting module 26C learns the packet error rate PER of the output signal Sout is higher than the first error rate threshold according to the first packet error rate comparison result R1, the adjusting module 26C may generate the adjusting signal Sa to the impulse interference detecting unit 22 to increase the predetermined condition that the impulse interference detecting unit 22 uses for detecting whether impulse interference exists. For example, the signal strength threshold of the signal strength detecting module 22B is increased to lower the frequency at which the impulse interference detecting unit 22 issues the impulse interference eliminating request Re, so as to increase the number of erroneous symbols with unknown positions the Reed-Solomon decoder (the impulse interference eliminating unit 24) can correct to reduce the packet error rate PER.

In another embodiment, the error rate comparing module 26B may further compare the packet error rate PER generated by the error rate calculating module 26A with a second error rate threshold (lower than the above first error rate threshold) to generate a second packet error rate comparison result R2. From a perspective of physical meanings, a low packet error rate PER may represent that the number of erroneous symbols with unknown positions to be corrected is not large, and the Reed-Solomon decoder (the impulse interference eliminating unit 24) is capable of correcting more erroneous symbols with known positions. Thus, if the adjusting module 26C learns the packet error rate PER of the output signal Sout is lower than the second error rate threshold according to the second packet rate comparison result R2, the adjusting module 26C may generate the adjusting signal Sa to the impulse interference detecting unit 22 to lower the predetermined condition that the impulse interference detecting unit 22 uses for detecting whether impulse interference exists. For example, the signal strength threshold of the signal strength detecting module 22B is lowered to increase the frequency at which the impulse interference detecting unit 22 issues the impulse interference eliminating request Re, so as to increase the number of erroneous symbols with known positions that the Reed-Solomon decoder (the impulse interference eliminating unit 24) can correct. In practice, the first and second error rate thresholds are not limited to specific values, and may be determined according to simulation results or practical experiences of a circuit designer.

Figure 5:
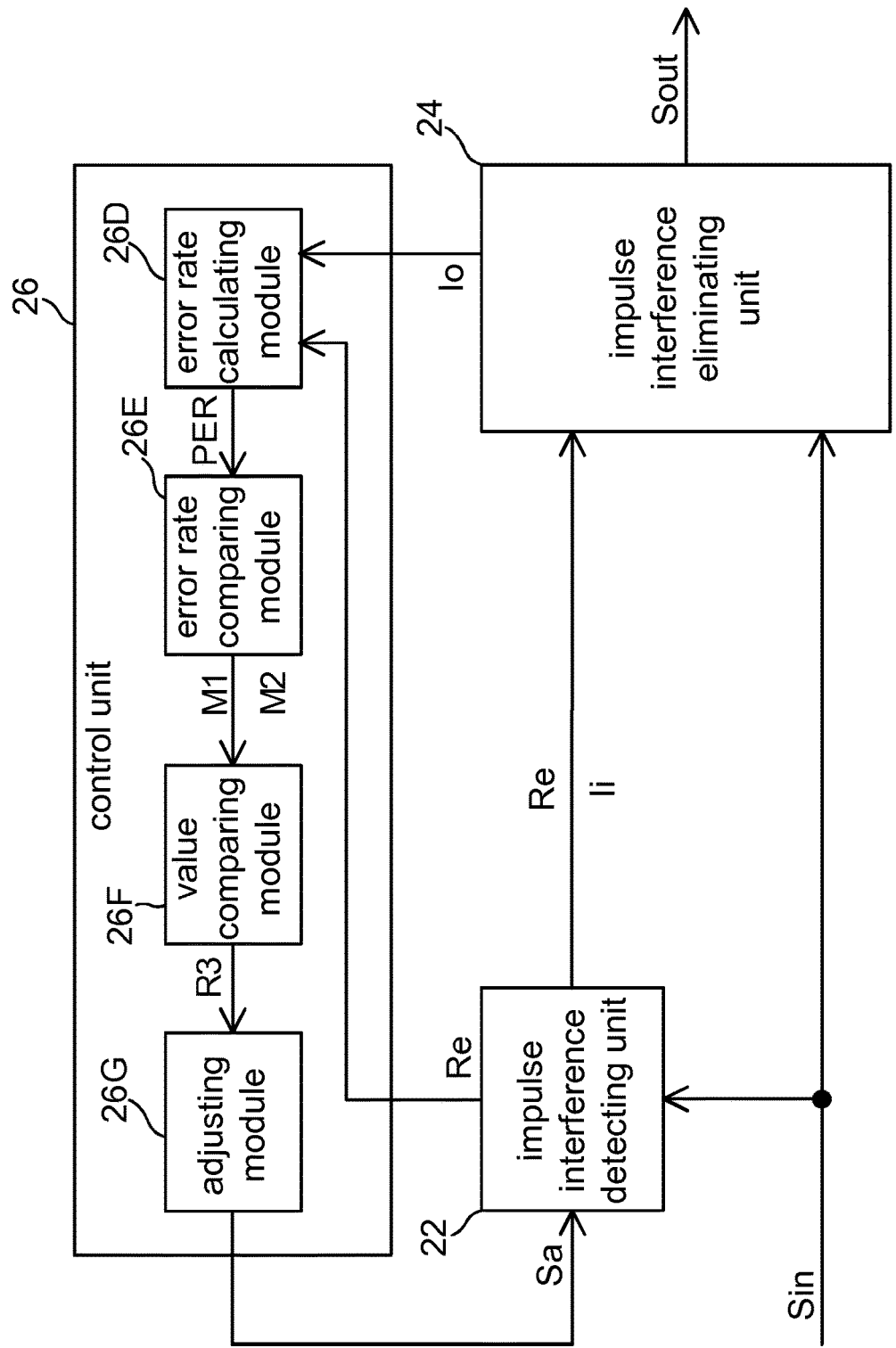
FIG. 5 is a detailed schematic diagram of a control unit according to another embodiment of the present invention.

FIG. 5 shows a detailed schematic diagram of the control unit 26 according to another embodiment. In the embodiment, the control unit 26 includes an error rate calculating module 26D, an error rate comparing module 26E, a value comparing module 26F and an adjusting module 26G. After receiving the impulse interference eliminating request Re, the error rate calculating module 26D starts to generate a packet error rate PER for the output signal Sout of N periods, where N is an integer and is greater than 1. That is, the error rate calculating module 26D generates a total of N packet error rates PER. The error rate comparing module 26E compares the N packet error rates PER with a first error rate threshold and a second error rate threshold, respectively, to generate a first value M1 that represents the number of packet error rates PER higher than the first error rate threshold and a second value M2 that represents the number of packet error rates PER lower than the second error rate threshold, where M1 and M2 are integers between 0 and N, and the first error rate threshold is higher than the second error rate threshold. In other words, in the N packet error rates PER, M1 packet error rates PER are higher than the first error rate threshold, and M2 packet error rates PER are lower than the second error rate threshold. The error rate comparing module 26E outputs the first value M1 and the second value M2 according to the comparison results to the value comparing module 26F. The value comparing module 26F compares the first value M1 with the second value M2 to output a value comparison result R3 to the adjusting module 26B. If it is learned that the first value M1 is greater than the second value M2 according to the value comparison result R3, the adjusting module 26G generates an adjusting signal Sa to the impulse interference detecting unit 22 to increase the predetermined condition that the impulse interference detecting unit 22 uses for detecting whether impulse interference exists. In contrast, if it is learned that the first value M1 is smaller than or equal to the second value M2 according to the value comparison result R3, the adjusting module 26G generates the adjusting signal Sa to the impulse interference detecting unit 22 to lower the predetermined condition that the impulse interference detecting unit 22 uses for detecting whether impulse interference exists. Different from the control unit 26 in FIG. 4, the control unit 26 in FIG. 5 may be regarded as determining whether to adjust the predetermined condition that the impulse interference detecting unit 22 uses for detecting whether impulse interference exists only after collecting comparison results of multiple periods. Such approach provides an advantage of preventing the system from becoming unstable due to frequent changes of the predetermined condition.

In practice, the control unit 26 in FIG. 2 to FIG. 5 may be implemented by various control and processing platforms, including fixed programmable logic circuit, e.g., programmable logic gate arrays, application-specific integrated circuits, microcontrollers, microprocessors, and digital signal processors. Further, the control unit 26 may also be designed to complete a designated task through executing a processor command stored in a memory (not shown).

Figure 6:
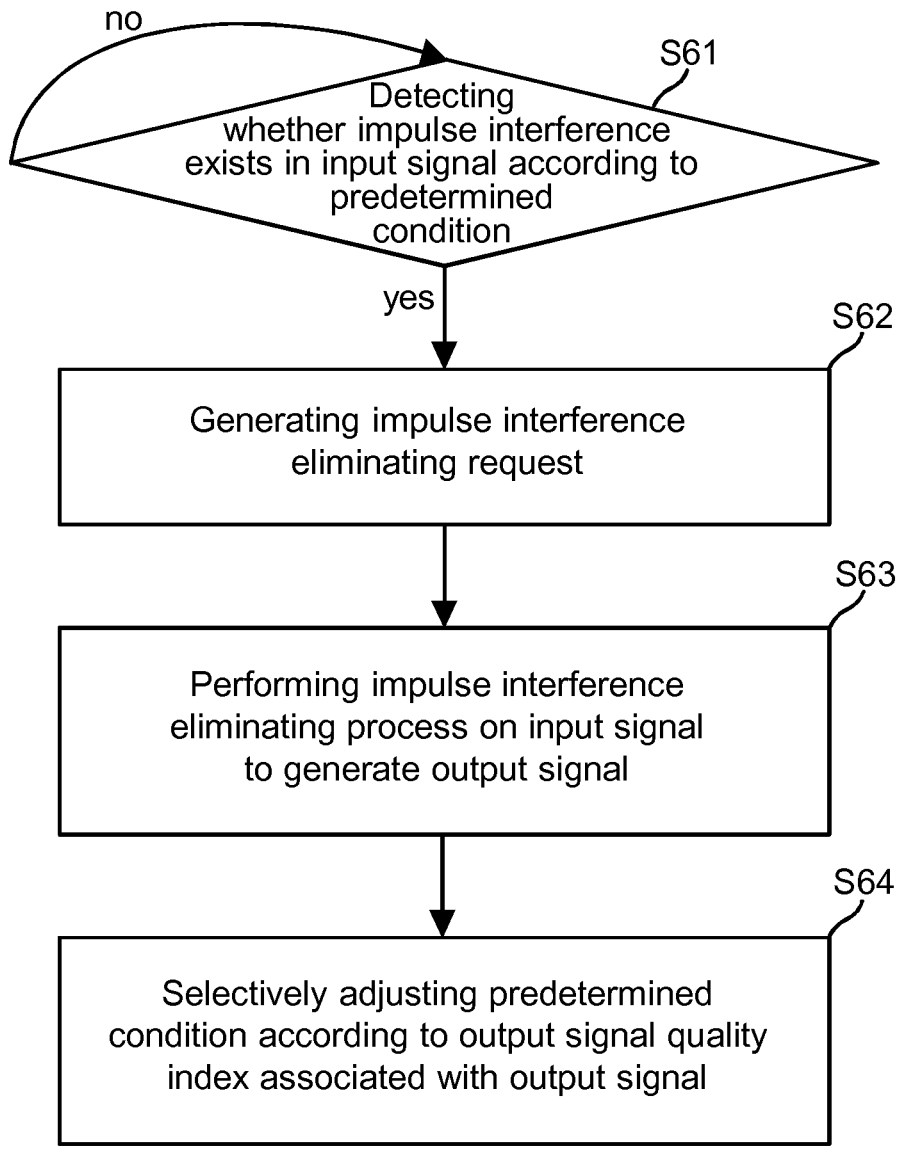
FIG. 6 is a flowchart of a method for eliminating impulse interference according to an embodiment of the present invention.

FIG. 6 shows a flowchart of a method for eliminating impulse interference according to an embodiment of the present invention. One person ordinary skilled in the art can understand details of the method for eliminating impulse interference in FIG. 6 based on the description associated with FIG. 2 to FIG. 5. Such repeated details are omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for eliminating impulse interference, comprising:
   a) detecting whether impulse interference exists in an input signal according to a predetermined condition, and generating an impulse interference eliminating request when having detected that the input signal satisfies the predetermined condition;
   b) in response to the impulse interference eliminating request, performing an impulse interference eliminating process on the input signal to generate an output signal; and
   c) selectively adjusting the predetermined condition according to an output signal quality index associated with the output signal,
   wherein an impulse interference eliminating unit generates the output signal,
   wherein the output signal quality index comprises a packet error rate of the output signal, and
   wherein step (b) comprises:
   comparing the packet error rate with a first error rate threshold and a second error rate threshold, respectively, the first error rate threshold being higher than the second error rate threshold;
   increasing the predetermined condition for detecting whether impulse interference exists when the packet error rate is higher than the first error rate threshold; and
   lowering the predetermined condition for detecting whether impulse interference exists when the packet error rate is lower than the second error rate threshold.

2. The method according to claim 1, wherein step (a) comprises:
   detecting whether an impulse characteristic occurs in a waveform of the input signal;
   detecting whether signal strength of the input signal is higher than a strength threshold; and
   determining that the input signal satisfies the predetermined condition according to a detection result indicating that the impulse characteristic occurs in the waveform of the input signal and the signal strength of the input signal is higher than the strength threshold; and
   step (c) comprises:
   selectively adjusting the strength threshold according to the output signal quality index.

3. The method according to claim 1, wherein the impulse interference eliminating process performed on the input signal in step (b) is a Reed-Solomon error correction process.

4. The method according to claim 1, wherein step (c) comprises generating one packet error rate of the output signal for each of N periods, N being an integer and greater than 1, and step (c) further comprises:
   comparing the N packet error rates with a first error rate threshold and a second error rate threshold, respectively, to generate a first value M1 and a second value M2; wherein, the first error rate threshold is higher than the second error rate threshold, M1 and M2 are integers between 0 and N, and in the N packet error rates, M1 packet error rates are higher than the first error rate threshold and M2 packet error rates are lower than the second error rate threshold;
   comparing the first value M1 with the second value M2 to generate a value comparison result;
   increasing the predetermined condition used for detecting whether impulse interference exists if the value comparison result indicates that the first value M1 is greater than the second value M2; and
   lowering the predetermined condition used for detecting whether impulse interference exists if the value comparison result indicates that the first value M1 is smaller than or equal to the second value M2.

5. A method for eliminating impulse interference, comprising:
   a) detecting whether impulse interference exists in an input signal according to a predetermined condition, and generating an impulse interference eliminating request when having detected that the input signal satisfies the predetermined condition;
   b) in response to the impulse interference eliminating request, performing an impulse interference eliminating process on the input signal to generate an output signal; and
   c) selectively adjusting the predetermined condition according to an output signal quality index associated with the output signal,
   wherein an impulse interference eliminating unit generates the output signal,
   wherein the output signal quality index comprises a packet error rate of the output signal,
   wherein step (c) comprises generating one packet error rate of the output signal for each of N periods, N being an integer and greater than 1, and step (c) further comprises:
   comparing the N packet error rates with a first error rate threshold and a second error rate threshold, respectively, to generate a first value M1 and a second value M2; wherein, the first error rate threshold is higher than the second error rate threshold, M1 and M2 are integers between 0 and N, and in the N packet error rates, M1 packet error rates are higher than the first error rate threshold and M2 packet error rates are lower than the second error rate threshold;
   comparing the first value M1 with the second value M2 to generate a value comparison result;
   increasing the predetermined condition used for detecting whether impulse interference exists if the value comparison result indicates that the first value M1 is greater than the second value M2; and lowering the predetermined condition used for detecting whether impulse interference exists if the value comparison result indicates that the first value M1 is smaller than or equal to the second value M2.

6. The method according to claim 5, wherein step (a) comprises:
   detecting whether an impulse characteristic occurs in a waveform of the input signal;
   detecting whether signal strength of the input signal is higher than a strength threshold; and
   determining that the input signal satisfies the predetermined condition according to a detection result indicating that the impulse characteristic occurs in the waveform of the input signal and the signal strength of the input signal is higher than the strength threshold; and
   step (c) comprises:
   selectively adjusting the strength threshold according to the output signal quality index.

7. The method according to claim 5, wherein the impulse interference eliminating process performed on the input signal in step (b) is a Reed-Solomon error correction process.

8. The method according to claim 5, wherein step (c) comprises generating one packet error rate of the output signal for each of N periods, N being an integer and greater than 1, and step (c) further comprises:
   comparing the N packet error rates with a first error rate threshold and a second error rate threshold, respectively, to generate a first value M1 and a second value M2; wherein, the first error rate threshold is higher than the second error rate threshold, M1 and M2 are integers between 0 and N, and in the N packet error rates, M1 packet error rates are higher than the first error rate threshold and M2 packet error rates are lower than the second error rate threshold;
   comparing the first value M1 with the second value M2 to generate a value comparison result;
   increasing the predetermined condition used for detecting whether impulse interference exists if the value comparison result indicates that the first value M1 is greater than the second value M2; and
   lowering the predetermined condition used for detecting whether impulse interference exists if the value comparison result indicates that the first value M1 is smaller than or equal to the second value M2.

* * * * *

UNITED STATES PATENT AND TRADEMARK OFFICE
CERTIFICATE OF CORRECTION

PATENT NO. : 10,090,937 B2
APPLICATION NO. : 14/941795
DATED : October 2, 2018
INVENTOR(S) : You-Tsai Jeng et al.

Page 1 of 1

It is certified that error appears in the above-identified patent and that said Letters Patent is hereby corrected as shown below:

In the Claims

Column 7, Line 43, Claim 1, replace "step (b)" with -- step (c) --

Signed and Sealed this
Twenty-ninth Day of January, 2019

Andrei Iancu
*Director of the United States Patent and Trademark Office*